United States Patent [19]

Alard

[11] Patent Number: 5,640,125

[45] Date of Patent: Jun. 17, 1997

[54] DIGITAL PSK-TYPE DEMODULATOR HAVING CLOCK RECOVERY BEFORE CARRIER RECOVERY

[75] Inventor: Michel Alard, Paris, France

[73] Assignee: Matra Communication, Quimper, France

[21] Appl. No.: 564,092

[22] PCT Filed: Jun. 16, 1994

[86] PCT No.: PCT/FR94/00724

§ 371 Date: Dec. 13, 1995

§ 102(e) Date: Dec. 13, 1995

[87] PCT Pub. No.: WO95/01034

PCT Pub. Date: Jan. 5, 1995

[30] Foreign Application Priority Data

Jun. 16, 1994 [FR] France .................................. 93 07324

[51] Int. Cl.[6] .................................................. H04L 27/22
[52] U.S. Cl. .......................... 329/306; 329/308; 375/326; 375/327; 375/332
[58] Field of Search ..................................... 329/304, 306, 329/307, 308, 309, 310; 375/324, 325, 326, 327, 329, 330, 331, 332

[56] References Cited

U.S. PATENT DOCUMENTS

| 4,466,108 | 8/1984 | Rhodes | 329/308 |
| 5,036,296 | 7/1991 | Yoshida | 331/17 |

FOREIGN PATENT DOCUMENTS

| 0 353 779 | 2/1990 | European Pat. Off. . |
| 0 355 587 | 2/1990 | European Pat. Off. . |

*Primary Examiner*—Siegfried H. Grimm
*Attorney, Agent, or Firm*—Larson and Taylor

[57] ABSTRACT

For demodulating a phase-modulated signal having 2M states of a carrier (M being an integer), the signal is converted into two baseband signals in quadrature. For that, they are multiplied by a signal delivered by a local oscillator at a transposed carrier frequency. Then the baseband signals are digitized by sampling at the clock frequency of the modulating signal. The clock of the signal is recovered by adjusting the phase of a local clock, stabilized at a bit frequency. For that, a minimum value of the intersymbol interference is searched. The signal clock is recovered before the carrier is recovered. Devices for implementing the method are also disclosed.

9 Claims, 3 Drawing Sheets

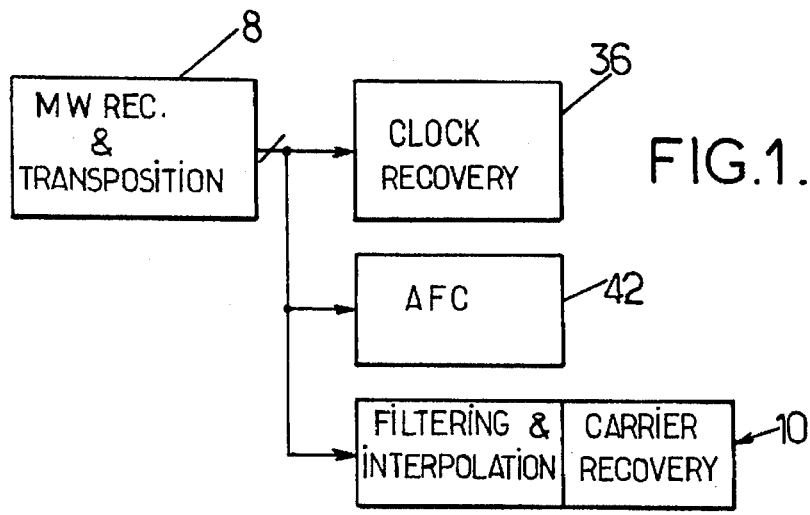
FIG.1.
FIG.2.
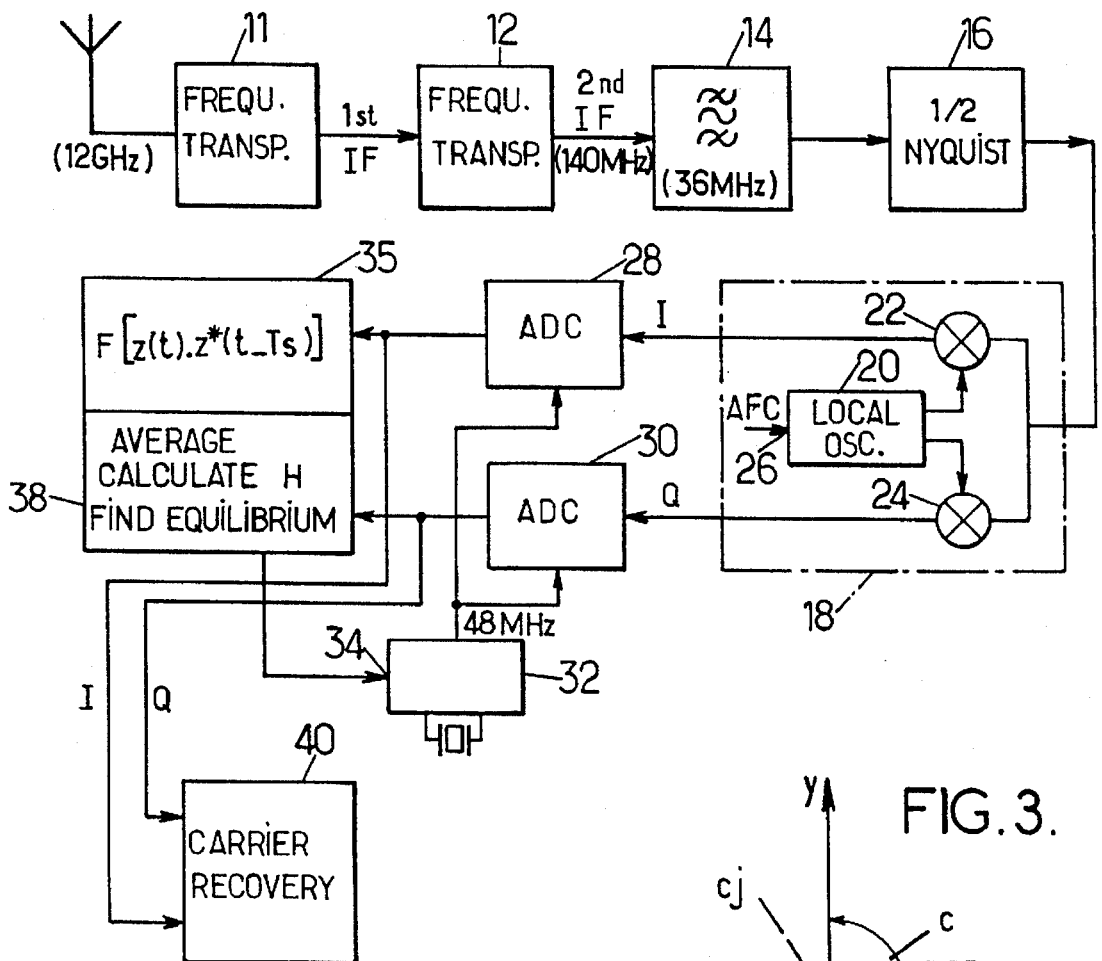
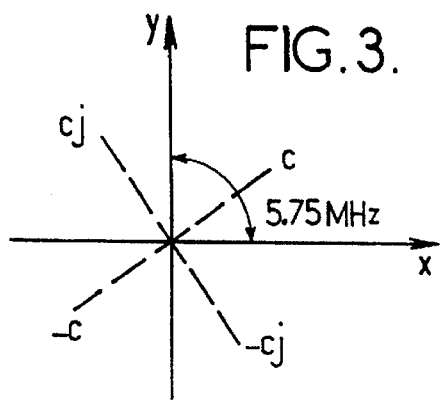
FIG.3.

DIGITAL PSK-TYPE DEMODULATOR HAVING CLOCK RECOVERY BEFORE CARRIER RECOVERY

BACKGROUND OF THE INVENTION

The present invention relates to a method and to apparatus for demodulating a signal in which a carrier is modulated with M phase states, M being an integer, and generally even, and in particular $M=2^m$ states (m being an integer).

A particularly important, though non-exclusive application of the invention lies in digital transmission systems using quaternary phase shift keying or 8-state phase shift keying (QPSK or 8PSK) or modulation of a microwave carrier (i.e. having a frequency of at least 3 GHz). A particular application that may be mentioned is simultaneous transmission of a plurality of digital television programs in the form of a multiplex in a satellite broadcast channel in the 12 GHz band.

Nevertheless, as can be seen below, the invention applies to demodulating any signal using PSK modulation of a carrier and it is advantageous whenever carrier recovery conditions are unfavorable.

Systems for transmission and broadcasting over a satellite channel often use PSK type modulation (in particular QPSK or 8PSK) with prior encoding for protection against errors that increases the required data rate. In particular, use is made of convolutional error protection codes or of concatenated codes (associating convolutional encoding with Reed-Solomon encoding), thereby eliminating errors almost completely even for $Eb/N_0$ ratios as small as 2 dB to 4 dB (where Eb is energy conveyed per bit and $N_0$ is noise level). The efficiency of encoding systems causes these values to correspond to $Ec/N_0$ ratios that are close to 0 dB (where Ec is energy per bit transmitted after encoding).

The same problem is encountered when using trellis modes of encoding which enable the spectrum efficiency of a non-coded system to be retained by increasing the number of modulation states.

Error protection encoding systems increase the data rate to be transmitted for a given number of useful bits, but complicate carrier recovery when demodulating on reception, and very often it is carrier recovery performance that puts a limit on the overall performance of the system.

SUMMARY OF THE INVENTION

The invention relates more particularly to demodulation methods which include converting the received signal into a baseband signal on two paths in quadrature by means of a signal provided by a local oscillator at the carrier frequency (generally after transposition to an intermediate frequency). The baseband signal is digitized by sampling it at the clock frequency of the modulating signal. Conventionally, the generally transposed carrier is recovered "blind", i.e. without knowing the instants at which the eye diagram is open at its widest. The loss of performance due to this "blind" recovery is not fatal when the transposition local oscillator is sufficiently stable for reliable carrier recovery to be possible with a narrow frequency acquisition range. Those circumstances apply to professional decoders.

The same is not true of consumer receivers in which the transposition local oscillator is liable to drift by several MHz: carrier recovery over such a wide range then becomes difficult and may turn out to be impossible with a signal having a low $Ec/N_0$, as is frequently the case for signals having highly redundant error protection encoding.

It might be thought that better results would be obtained by simultaneously recovering the carrier and the clock by means of a highly non-linear recovery loop with feedback.

The present invention proposes performing clock recovery prior to carrier recovery so as to enable sampling to be performed at instants when the opening of the eye diagram is optimum, and for this purpose makes use of the fact that the correspondence between the frequency of the local clock and the frequency of the received signal clock is generally very accurate, unlike the correspondence between the transposed carrier frequency and the local clock frequency for transposing to baseband. The reason is that because the local clock operates at fixed frequency, it can be crystal stabilized and the accuracy of the signal clock is affected little by transmission since the only source of degradation is the Doppler effect. In contrast, the local oscillator for frequency transposition must operate with an adjustable frequency.

Consequently, the invention proposes a method of the kind defined above characterized in that the signal clock is recovered by setting the phase of a local clock which is stable at bit frequency by seeking the intersymbol interference minimum prior to recovering the carrier.

Thereafter, it is advantageous to control the frequency of the local oscillator until the frequency error in the sampled and digitized signal is at a minimum.

In a first embodiment, the intersymbol interference (ISI) minimum is obtained by seeking the minimum of a function of the value of the signal which is non-linear and which cancels for at least four points in the phase state constellation (four points when using 4PSK modulation).

In particular, this function may have the form $F[z(t).z^*(t-T_s)]$, where the product is intended to eliminate the unknown phase and F is a function having the property of presenting minima, preferably zeros, for all points in the constellation. For example, the function F may be the minimum of the distances between a received point and all of the points in the constellation; $z=x+jy$ represents the value of the signal on the paths I and Q, and $T_s$ is the symbol period. Periodically, at ideal sampling instants, the product takes a value whose modulus is equal to the square of the modulus of the signal, and whose phase takes a value of the form $2k\pi/M$, where k is an integer. A fixed constellation is thus obtained.

In another embodiment, the signal is sampled after conversion to baseband, variation in the mean energy of the signal is measured as a function of the sampling phase, and the phase is selected for which that energy is at a maximum. This solution can be used whenever there is sufficient excess band compared with the Nyquist limit, or when band roll-off is progressive.

The invention also provides demodulation apparatus enabling the above-defined method to be implemented. In conventional manner, the apparatus comprises means including at least one oscillator for transposing the received signal to an intermediate frequency; means for conversion to baseband on two paths in quadrature, making use of a local oscillator at a frequency which is adjustable around a nominal value; means for digitally converting the two paths, comprising an adjustable phase clock stabilized on the bit frequency of the incoming clock; and means for recovering the carrier and for coherent demodulation of the two paths. In an aspect of the invention, the apparatus further comprises means for adjusting the phase of the clock to the value which corresponds to the minimum of intersymbol interference, and means for controlling the local oscillator for transposing to baseband, the phase of the clock being adjusted by analyzing the signal prior to recovering the carrier.

The invention will be better understood on reading the following description of particular embodiments given as non-limiting examples. The description refers to the accompanying drawings.

BRIEF DESCRIPTION OF THE DRAWINGS

FIG. 1 is a block diagram showing the overall structure of a demodulator enabling the invention to be implemented;

FIG. 2 is a block diagram of a clock recovery module of the invention suitable for use in the demodulator of FIG. 1, and also showing one possible structure for the upstream portion that performs frequency transposition;

FIG. 3 shows a disposition that can be taken up by the constellation of points representative of phase states when using QPSK modulation (which is also known as 4PSK);

DETAILED DESCRIPTION OF PREFERRED EMBODIMENTS

Figure 4:
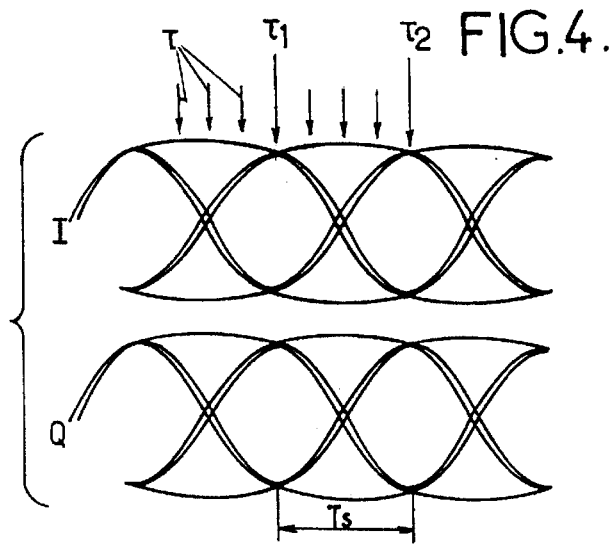
FIG. 4 shows the appearance of the eye diagram for a QPSK modulating signal.

The demodulator whose overall structure is shown in FIG. 1 may be used, in particular for demodulating a signal broadcast by satellite and having PSK modulation. It may be regarded as constituting a microwave receiver and transposition head 8 feeding:

a clock recovery module 36;

an automatic frequency control module 42; and carrier recovery circuits 10 capable, in some cases, of being preceded by additional filter and interpolation means.

The various above components are described below in succession, sometimes in several possible embodiments.

The head 8 may be of the relatively conventional structure shown in FIG. 2. In which case it comprises a microwave portion, e.g. designed to receive a signal in the 12 GHz band. This signal passes initially via a microwave portion having two frequency transposition circuits 11 and 12 in cascade, serving to transpose successively to a first intermediate frequency and then to a second intermediate frequency which is fixed, e.g. at 140 MHz. For a consumer microwave head, e.g. one designed for a "VSAT" system, the accuracy and the stability of the local oscillators (not shown in FIG. 1) is not sufficient to enable the intermediate frequency to be maintained to within less than a few MHz.

The signal as transposed to the second intermediate frequency is applied to a channel selection filter 14 which, for transmission from a satellite, generally has a bandwidth of about 36 MHz. The description below relates particularly to digital modulation at a rate of 46 Mbit/s, corresponding to 23 MHz at a symbol frequency $1/T_s$. When the transmitter is provided with a half-Nyquist filter, as is usually the case, the wideband filter is followed by a half-Nyquist filter 16 which may nevertheless be moved on down the digital processing system in baseband.

The signal is then applied to means 18 for converting it to baseband, which means comprise an oscillator 20 whose frequency should be as close as possible to the frequency of the transposed signal (referred to below as the carrier frequency), and providing two sinewaves that are mutually offset by a 90° phase shift. The waves are applied to respective multipliers 22 and 24 for delivering two signals I and Q in quadrature. In the advantageous embodiment shown in FIG. 2, the local oscillator 20 for shifting to baseband has a frequency that is controllable by a signal applied to an input 26.

An analog-to-digital converter 28 or 30 is then interposed on each of the I and Q paths, operating at a sampling frequency that is controlled by a local clock 32 at the bit frequency. The clock 32 may be crystal stabilized, and it generally operates at the bit frequency to within $10^{-5}$, and thus with very high accuracy. By using servo-control, its long term error can even be reduced to zero. In this case, the clock 32 has a phase adjustment input 34. The values c, cj, −c, and −cj taken by the signal at the sampling instants need not correspond to the nominal points (i.e. for 4PSK, the points on the axes, as shown in FIG. 3). In FIG. 3, a quadrant corresponds to an error of $1/4T_s$, i.e. 5.75 MHz for 4PSK modulation at 46 Mbits/s.

If the clock has been recovered exactly, then the sampling instants occur at $\tau_1, \tau_2, \ldots$ at intervals $T_s$ in FIG. 4, and subsequent processing makes use of additional points $\tau$ obtained by oversampling at the frequency $4f_s$, in order to attain a sampling period of $T_s/4$.

According to an aspect of the invention, the sampled I and Q signals are applied directly to means 35 for clock recovery and for controlling the phase of the sampling clock 32, thereby enabling the sampling instants to be adjusted so that they are optimally located relative to the eye diagram.

In the embodiment shown in FIG. 2, the invention makes use of the properties of the function $z(t).z^*(t-T_s)$ where $z(t)=x(t)+yj(t)$ represents the value of the signal on the I and Q paths. This function periodically takes the values a, aj, −a, and −aj where a is the square of the common modulus of c, −c, cj, and −cj. The complex product may be represented in FIG. 3 by points which conserve a fixed angular position relative to an axis, said position being representative of frequency error and being suitable for use in automatic frequency control.

Since differential demodulation eliminates phase, which is unknown, it is possible to use this property to identify the optimum sampling phase, i.e. the phase which corresponds to minimum dispersion.

For this purpose, it is possible to use a non-linear function F(z) which cancels for the four points of the 4PSK constellation (or more generally for all of the points of the constellation when using modulation other than 4PSK). By way of example, this function may be the minimum of the squares of the Euclidean distances to one of the four points of the constellation when using 4PSK. To use this approach, it is possible to adopt a random sequence $X_n(t)$ defined as follows:

$$X_n(t)=F[z(t+nT_s).z^*(t+(n-1)T_s)]$$

where the star * identifies the complex conjugate.

The mean value of this sequence for each value of t is a periodic function G(t) having the appearance shown in FIG.

5. The minima of this variance function (representative of dispersion) corresponds to the optimum sampling instants. However the minima are zero only if the eye diagram is perfect. A simple method of seeking the minima, which applies in all cases, consists in taking advantage of the symmetry of the function G(t). For this purpose, it is possible to use the function H(t) defined as follows:

$$H(t)=G(t+T_s/4)-G(t-T_s/4)$$

This function cancels for the optimum phase and has a maximum for $t=+T_s/4$ and for $t=-T_s/4$.

Figure 5:
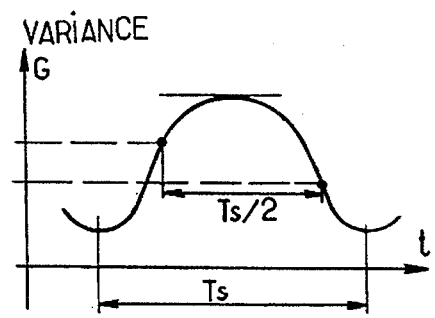
FIG. 5 is a graph for showing one possible way in which the variance of the signal used for clock recovery may itself vary as a function of time.

This approach may be implemented with a first hardware or software calculation module 35 (FIG. 2) which calculates $F[z(t).z^*(t-T_s)]$, and a second module 38 which calculates H for successive values of t, by taking the difference between the variances of pairs of points separated by $T_s/2$, taking an average, and controlling the clock 32 to cause H to cancel and to reach equilibrium between the two points shown in FIG. 5.

Thereafter, the diagram shown includes a module 40 which also receives the digitized samples $I(f_s)$ and $Q(f_s)$ at the symbol frequency. The samples are processed conventionally in module 40 for carrier recovery, e.g. raising the signal to the 4th power (or using a Costas loop) and performing coherence or differential demodulation (again not shown). Filtering may be performed upstream from the recovery circuit. In addition, interpolation is necessary when sampling takes place at the period $T_s$ (FIG. 4).

A module 42 is generally provided for providing automatic frequency control of the local oscillator 20 and for adapting to the carrier frequency (FIG. 1). One possible simple structure for this module is described below.

Figure 6:
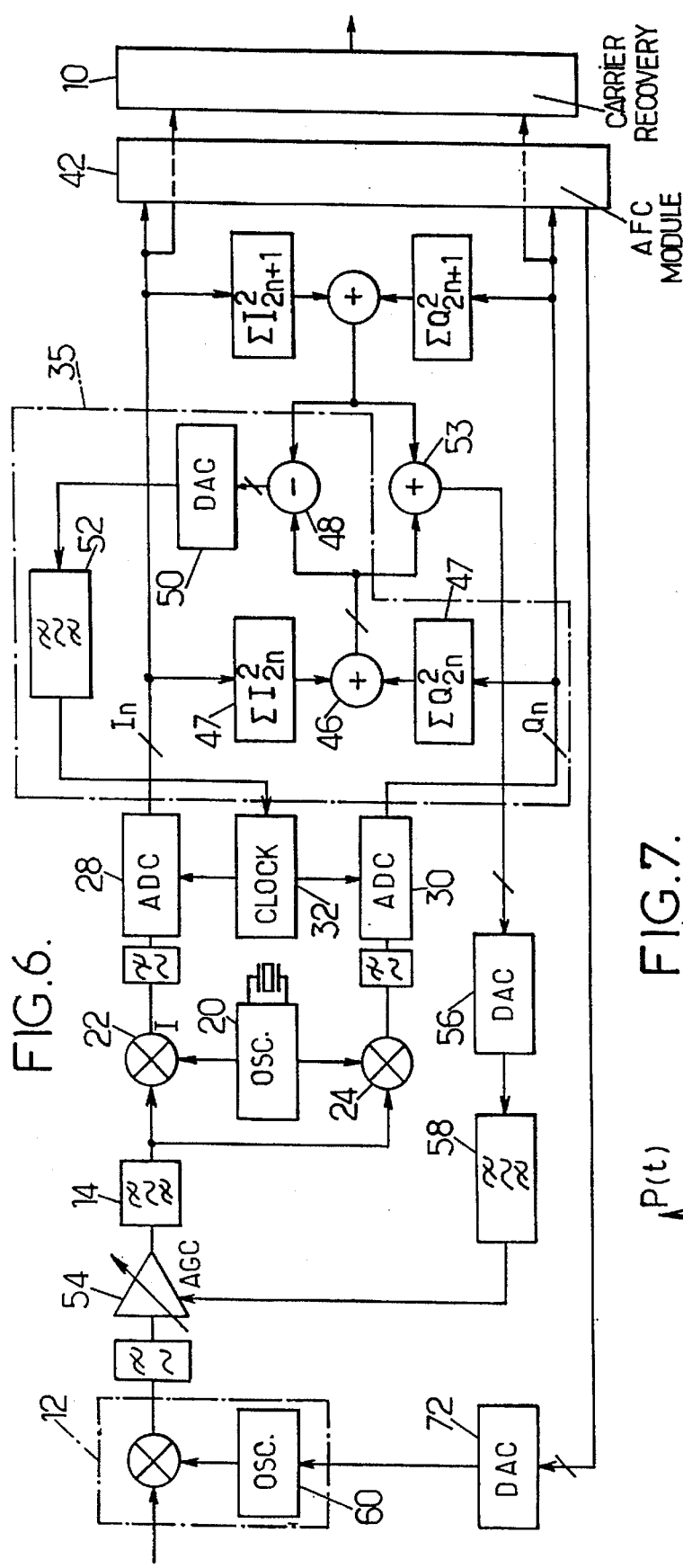
FIG. 6 is similar to FIG. 2, and shows another embodiment.

FIG. 6, similar to FIG. 2, shows another embodiment that is simpler than the preceding embodiment and is generally more advantageous; in the example shown in FIG. 6, clock recovery is based on energy considerations.

Theoretical analysis demonstrates that the approach used is valid. It makes use of a function P(t) representative of the energy distribution in the sampling phase, modulo $T_s$:

$$P(t)=E(|s(t)|^2)$$

where E(.) is mathematical expectation.

Calculation shows that P(t) is a periodic function of period $T_s$, and the expression therefore varies slightly depending on the method of filtering.

When a half-Nyquist filtered signal comes directly from the transmitter with a roll-off factor α, then:

$$P(t)=1+(2\alpha/\pi)\cos 2\pi t/T_s$$

For a Nyquist filtered signal having a roll-off α, then:

$$P(t)=1-\tfrac{1}{4}\alpha+\tfrac{1}{4}\alpha\cos 2\pi t/T_s$$

Figure 7:
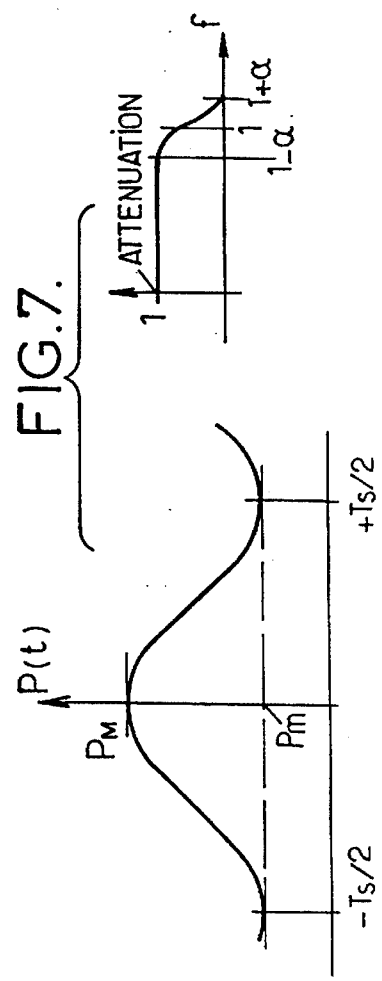
FIG. 7 shows the appearance of a function used in seeking the correct clock phase.

In all cases, the function P(t) has the appearance shown in FIG. 7, with a maximum $P_M$ and a minimum $P_m$ that are spaced apart by $T_s/2$. The ratio $p=P_M/P_m$ depends on the roll-off α and on the filtering function (half-Nyquist or Nyquist). The following values may be considered as being representative, α being defined as specified on the right of FIG. 7, and the limit 1 corresponding to a limit of the Nyquist band.

|  | α = 0.3 | α = 0.5 | α = 1 |
|---|---|---|---|
| half-Nyquist | 1.4721 | 1.9339 | 4.5039 |
| Nyquist | 1.1765 | 1.3333 | 2 |

For low roll-off factors α, corresponding to a channel filter 14 having a sharp cutoff, variations of P(t) are significant, particularly when using half-Nyquist filtering. It is then advantageous to use the received signal after channel filtering but prior to reception half-Nyquist filtering, in the usual case where full Nyquist filtering is shared between the transmitter and the receiver. The fact that noise is then widened prior to the signal being taken into account when calculating P(t) is a minor difficulty only, since the ratio of the channel filter noise band divided by the reception half-Nyquist filter noise band (filters 14 and 16 in FIG. 2) is $(1+\alpha)$. Noise affecting the signal therefore adds to the function P(t) only a DC component that is slightly greater than when using the signal prior to reception half-Nyquist filtering.

An additional advantage of using the signal taken from upstream of the reception half-Nyquist filter is that a frequency error affecting the received signal does not change the function P(t) in any way so long as the received signal is not significantly affected by off-centering in the channel filter 14. So long as the signal remains within the passband of the channel filter, off-centering gives rise to no more than multiplication by a complex exponent. As in the preceding case, the optimum sampling instants correspond to minima in P(t).

To find the minima, it is also possible to use the difference between two values at instants that are spaced apart by $T_s/2$, in this case the function H:

$$H(t)=P(t-T_s/4)-P(t+T_s/4)$$

This function is symmetrical about the origin, cancels for $T_s/2$ and $-T_s/2$, and has maxima at $T_s/4$ and $-T_s/4$ relative to the correct clock phase.

The second member of the function H(t) may be estimated by two average power calculations, one performed on a few successive even samples at the sample frequency $1/T_s$, and the other on the same number of odd samples while using subtraction.

Calculations of the power P should be performed at nominal phase positions $-T_s/4$ and $+T_s/4$. They make it possible to obtain $P_{2n}=I^2_{2n}+Q^2_{2n}$ and $P_{2n-1}$.

The zero crossing of $P_{2n}-P_{2n-1}$, representative of H(t), constitutes a criterion for servo-controlling the phase of the clock 32.

The embodiment shown in FIG. 6 (where some of the lowpass filters are omitted for greater clarity) corresponds to a 4PSK (or QPSK) signal in the standardized satellite band, using the signal prior to half-Nyquist filtering for clock recovery.

The analog signals at the outputs of the multipliers 22 and 24 are applied to respective analog-to-digital converters 28 and 30. When transmission is taking place on a satellite channel, the channel filter 14 has a bandwidth of 36 MHz and in general it accepts a roll-off factor α of about 0.5. The oscillator 20 is a fixed frequency oscillator, with the apparatus of FIG. 6 including automatic frequency control for maintaining the second intermediate frequency, as described below. The phase of the local clock 32, whose nominal frequency is 48 MHz, is controlled by the clock recovery loop.

The clock recovery loop uses the sampling sequences $I_s$ and $Q_s$ that appear at the outputs from the converters 28 and 30 at a rate equal to twice the symbol frequency $1/T_s$, i.e. at the bit frequency.

The instantaneous power at the sample appearance rate is then calculated separately and the average power is calculated both for the even samples and for the odd samples. In FIG. 6, the branch for calculating on even samples $I_{2n}$ includes two elements 47 for raising to the square (and generally capable of accumulating a few samples) plus an adder 46. The branch for calculating on odd samples is similar. A subtracter 48 then makes it possible to obtain an output signal that is continuously representative of the above function H. This digital signal is used for controlling the clock 32 via a digital-to-analog converter 50 and a loop lowpass filter 52 that averages over several hundred samples.

When the samples $I_n$ and $Q_n$ are digitized using 8 bits, it is generally sufficient to make use of 12-bit subtracters, while averaging over a number of samples that is small (e.g. four) but large enough to reduce the speed required by the DAC 50. In practice, it is also possible to accumulate the squares of the samples by means of a lowpass filter.

In the diagram of FIG. 6, it can be seen that the clock 32 is controlled so as to bring the function H to $\phi$. The DC components which appear in the signals are automatically eliminated in the processing.

Figure 8:
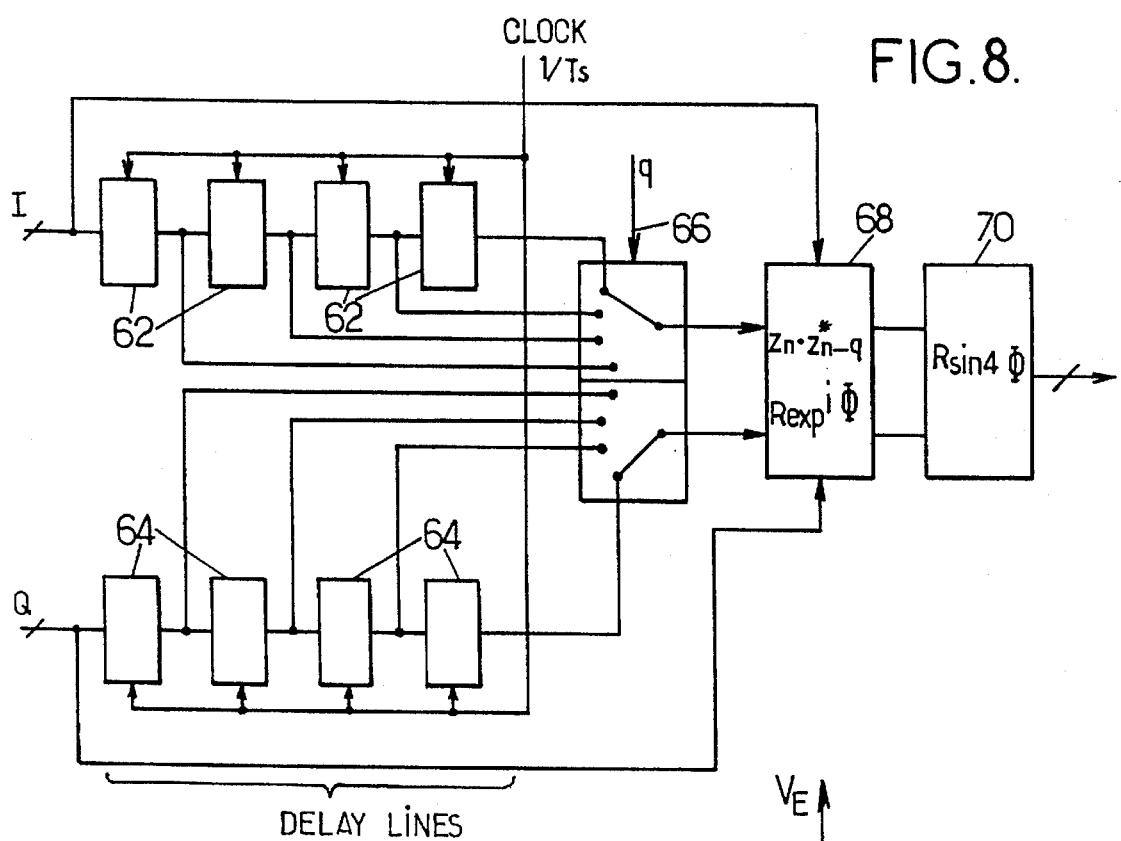
FIG. 8 is a block diagram of one particular way of automatically controlling the frequency of a transposition oscillator, enabling the carrier frequency to be recovered so long as it is to be found within an adjustable capture range.

The digitized samples $I_n$ and $Q_n$ are also applied to the module 10, and also to the automatic frequency control module 42, with one possible structure thereof being given in FIG. 8. The module 10 performs reception half-Nyquist filtering and interpolation; this interpolation which is necessary for providing samples at all sampling instants $\tau$, may be combined with the half-Nyquist filtering in a single transverse filter. The original samples and those obtained by interpolation are used for recovering the carrier and restoring data, e.g. by differential demodulation.

It is advantageous to use the power signal to perform automatic gain control. In the example shown in FIG. 6, the already available powers of the even and odd signals are added together at 53 and used for controlling the gain of an amplifier 54 prior to frequency transposition, via a digital-to-analog converter 56, and a loop lowpass filter 58.

The loop for automatically controlling the frequency of the transposition oscillator in the circuit 12 is now described in the context of an M-state PSK-modulated signal.

At the input of block 42, a sequence of complex symbols $z_n$ is available at the symbol frequency $1/T_s$, and the following may be written:

$$z_n = c_n A . \exp(i\phi),$$

where

A and $\phi$ represent the amplitude and the phase at an instant t; and $C_n$ represents the value of the transmitted symbol which is as follows: 1 or −1 in 2PSK; 1, i, −1, or −i in 4PSK.

At the input of block 42, the carrier has not yet been recovered so $\phi$ is unknown.

In addition, the signal may be subject to an error $\Delta f$ concerning the transposed frequency due to drift in the oscillator 60 (FIG. 6). It is therefore desirable to correct $\Delta f$ which is related to the phase $\phi$ and to the ideal phase $\phi_0$ by:

$$\phi = \phi_0 + \Delta f . T_s$$

The frequency control loop shown in FIG. 8 makes use of a delay line discriminator to estimate the frequency error $\Delta f$ and is capable of providing an arbitrary delay of q symbol times $T_s$ selected from a plurality of successive delays. It is thus possible to determine a magnitude $S_n$:

$$S_n = z_n . z^*_{n-q}$$
$$= A^2 C_n C_{n-q} \exp(2i\pi q . \Delta f . T_s)$$

In this case, M-state PSK modulation provides symbols of the form: $\exp(2i\pi . m/M)$.

In this case, $c_n . c_{n-q}$ only takes values of the form $\exp(2i\pi . m/M)$ and the problem reduces to estimating phase error, and it is known how to do that.

Also, because of differential demodulation in the block 57, it is possible to transform the frequency error estimate into a phase error estimate.

There exist numerous implementations enabling the above function to be performed, such as a Costas loop and variants thereof.

In all cases, a search is made to obtain a characteristic of the form:

$$V_e = K . \sin M\Delta\phi$$

where:

$$\Delta\phi = 2\pi q\Delta T_s$$

$V_e$ is the output signal, and

K is a constant.

The error signal $V_e$ is periodic and its period is defined by the relationship $Mq\Delta fT = 1$.

Figure 9:
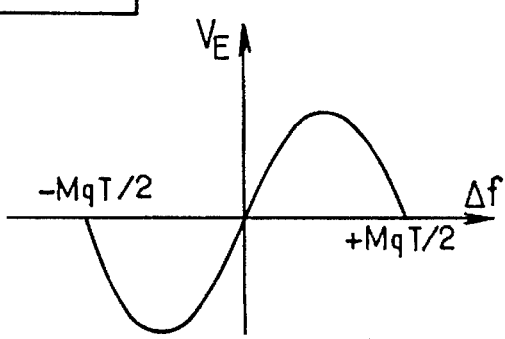
FIG. 9 shows the appearance of a function used in recovering the carrier.

The output signal varies as a function of the phase error $\Delta f$ in application of a law that is then of the kind shown in FIG. 9 from which it can be seen that the loop cannot give rise to capture outside the band $-\pi/MqT_s$ to $+\pi/MqT_s$. It may be adjusted in such a manner as to be adapted to the stability of the oscillator 60 by an appropriate choice of the number of available delays $q.T_s$.

For example, for 4PSK modulation at 40 Mbit/s, the capture range for q=1 (only one delay available) is ±2.5 MHz. The width of this range is inversely proportional to q, but frequency accuracy and sensitivity increase in proportion to q.

In the embodiment shown in FIG. 8, for use with a 4PSK signal, q may lie in the range 1 to 4. The signals $I_n$ and $Q_n$ are addressed on respective delay lines to four elements 62 and 64 which may be constituted by shift registers controlled at the symbol frequency $1/T_s$. The number q of symbol times by which the signal is delayed is selected by means of an input 66.

A software or hardware calculation module 68 calculates $z_n . z^*_{n-q}$, which is written in the form of a constant R being multiplied by $i\phi$. This product is used by a second module 70 to estimate $\phi$, i.e. the polar angle of $z_n . z^*_{n-q}$, from which $R.\sin 4\phi$ is deduced (when using 4PSK modulation).

The calculation may be performed approximately and may be restricted to selecting the closest available value in a table. The result, e.g. as obtained using the same number of bits as I and Q, is used after digital-to-analog conversion 72 to control a band filter for controlling the frequency of the oscillator 60.

I claim:

1. A method of demodulating an input signal consisting of a carrier at a predetermined frequency, phase modulated with M phase states by a modulating signal, where M is an integer, comprising:

converting the input signal to baseband on two paths in quadrature by multiplication by a local oscillator signal at the frequency of the carrier;

sampling and digitizing the resulting baseband signal at a clock frequency of the modulating signal, to provide a sampled and digitized signal on each of said paths; and recovering the carrier from the sampled and digitized signals;

comprising the additional step of recovering, prior to carrier recovery, the clock of the modulating signal by setting a phase of a local clock stabilized on a bit frequency of the modulating signal, said step of recovering the clock of the modulating signal being accomplished by seeking a minimum of a function F of the value of the sampled and digitized signal, said function being non-linear and being equal to zero for the M points of a constellation of said phase states, whereby a minimum amount of intersymbol interference is obtained.

2. A method according to claim 1, wherein said function is of the form $F[z(t).z^*(t-T_s)]$ where $z=x+jy$ represents a value of the signal resulting from values x and y on I and Q paths, and $T_s$ is a period of occurence of successive symbols of the signal.

3. A method according to claim 2, wherein the minimum of said function F is searched by determining where the function $H(t)=G(t+T_s/4)-G(t-T_s/4)$ is zero, G representing a mean value of $F[z(t).z^*(t-T_s)]$.

4. A method of demodulating an input signal consisting of a carrier which is phase modulated with M phase states by a modulating signal, where M is an integer, comprising the steps of:

converting the input signal to baseband on two paths in quadrature by multiplication by means of a local oscillator signal at a frequency of the carrier;

digitizing the resulting baseband signal by sampling at a clock frequency of the modulating signal, provided by a local clock; and recovering the carrier from the sampled and digitized signal;

further comprising the additional step of recovering the clock of the modulating signal by setting a phase of said local clock stabilized at a bit frequency of the modulating signal, said step of recovering the clock being accomplished by seeking a minimum of intersymbol interference by sampling the sampled and digitized signal, measuring variations in the mean energy of the input signal as a function of sampling phase, and selecting the phase of the local clock for which the energy is maximum.

5. Apparatus for demodulating a received signal consisting of a carrier with M-state phase modulation, the apparatus comprising:

means for transposing the received signal to an intermediate frequency:

means for conversion of the transposed signal into two baseband signals on two paths (I, Q) in quadrature, including a local oscillator at a frequency;

means for sampling and digitally converting the two signals on the two paths, comprising an adjustable phase clock at a bit frequency of the received signal; and means for recovering the carrier and demodulating the input signal, the demodulation using the recovered carrier and the two signals on the two paths, further comprising:

means for adjusting the phase of the adjustable phase clock to a value which corresponds to a minimum of intersymbol interference, without reference to the carrier, having:

means for calculating a non-linear function $F[z(t).z^*(t-T_s)]$ where $z=x+jy$ represents the value of components x and y of the digitized signal on the I and Q paths, and $T_s$ is the symbol period, and means for controlling the phase of the adjustable phase clock in a direction to cause said function to become equal to zero.

6. Apparatus for demodulating a received signal consisting of a carrier with M-state phase modulation, the apparatus comprising:

means including at least one first local oscillator for transposing the received signal to an intermediate frequency;

means for conversion of the transposed signal into two baseband signals on two paths (I, Q) in quadrature, including a second local oscillator;

means for sampling and digitally converting the two signals on the two paths, comprising an adjustable phase clock at the bit frequency of a clock of the received signal; and means for recovering the carrier and for coherent demodulation using the two signals on the two paths, further comprising:

means for adjusting the phase of the adjustable phase clock to a value which corresponds to a minimum of intersymbol interference by analyzing the sampled and digitized signals prior to recovering the carrier, arranged to calculate energy distribution as a function of the phase of the adjustable clock phase and to control the clock phase so as to obtain a maximum of said energy distribution.

7. Apparatus according to claim 6, wherein said means for adjusting the phase are arranged to seek a maximum of an energy distribution function P by estimating two average powers, one over a plurality of successive even samples at a symbol frequency $1/T_s$, and the other over the same plurality of odd samples, by taking the difference of the two estimated powers, and by controlling the adjustable clock based on the difference.

8. Apparatus according to claim 6, for a 4PSK signal, wherein said means for controlling the phase of the clock are connected to receive digital sample sequences ($I_s$, $Q_s$) at twice the symbol frequency $1/T_s$, and comprise:

a first branch for calculating the average power for even samples and a second branch for calculating the average power for odd samples, each branch having two elements for raising to the square associated with the paths I and Q and accumulating a plurality of successive samples, plus an adder;

a subtracter forming an output signal that is continuously representative of the difference of outputs of the adders; and means performing digital-to-analog conversion and low-pass filtering of said output signal.

9. Apparatus according to claim 8, further including an input amplifier located between said means for transposing the received signal and said means for conversion, means for automatically controlling the gain of said input amplifier, comprising a supplemental adder for adding the outputs from the adders, and a digital-to-analog converter feeding a gain control input of the amplifier.

\* \* \* \* \*